(12) United States Patent
Deguchi et al.

(10) Patent No.: US 8,399,127 B2
(45) Date of Patent: Mar. 19, 2013

(54) NONAQUEOUS ELECTROLYTE SECONDARY BATTERY

(75) Inventors: Masaki Deguchi, Hyogo (JP); Tooru Matsui, Osaka (JP); Hiroshi Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 909 days.

(21) Appl. No.: 12/034,441

(22) Filed: Feb. 20, 2008

(65) Prior Publication Data

US 2008/0199773 A1    Aug. 21, 2008

(30) Foreign Application Priority Data

Feb. 20, 2007  (JP) ................. 2007-039326

(51) Int. Cl.
*H01M 10/40* (2006.01)
*H01M 10/02* (2006.01)

(52) U.S. Cl. ........................ 429/209; 429/328
(58) Field of Classification Search ............... None
See application file for complete search history.

(56) References Cited

U.S. PATENT DOCUMENTS

| | | | |
|---|---|---|---|
| 6,074,776 A * | 6/2000 | Mao et al. ............... | 429/61 |
| 6,255,021 B1 | 7/2001 | Kusumoto et al. | |
| 6,942,948 B2 * | 9/2005 | Takehara et al. .......... | 429/328 |
| 2004/0239291 A1 * | 12/2004 | Watanabe ................ | 320/106 |
| 2005/0095507 A1 | 5/2005 | Kim et al. | |
| 2006/0051663 A1 | 3/2006 | Fujita et al. | |
| 2006/0281007 A1 | 12/2006 | Tsutsumi et al. | |
| 2008/0137290 A1 | 6/2008 | Tanaka et al. | |

FOREIGN PATENT DOCUMENTS

| | | | |
|---|---|---|---|
| JP | 7-220759 | * | 8/1995 |
| JP | 11-54132 | | 2/1999 |
| JP | 11-191432 | | 7/1999 |
| JP | 2000-030686 | | 1/2000 |
| JP | 3-175730 | | 4/2001 |
| JP | 2002-270226 | | 9/2002 |
| JP | 3-371301 | | 11/2002 |
| JP | 2005-135895 | | 5/2005 |
| JP | 2005-294028 | | 10/2005 |
| JP | 2006-12788 | | 1/2006 |
| JP | 2006-120604 | | 5/2006 |
| JP | 2006-164873 | | 6/2006 |
| JP | 2006-318893 | | 11/2006 |
| JP | 2007-207443 | | 8/2007 |
| JP | 2008-218381 | | 9/2008 |
| WO | WO 2005/029632 A1 | | 3/2005 |

* cited by examiner

*Primary Examiner* — John S Maples
(74) *Attorney, Agent, or Firm* — McDermott Will & Emery LLP (57) ABSTRACT

A nonaqueous electrolyte secondary battery, comprising a positive electrode having a positive-electrode active material layer reversibly inserting and extracting lithium ions on a positive-electrode current collector, a negative electrode having a negative-electrode active material layer reversibly inserting and extracting lithium ions on a negative-electrode current collector, and a nonaqueous electrolyte solution, wherein at least one of the positive and negative electrodes has a film on the surface and at least one of the positive electrode, the negative electrode and the nonaqueous electrolyte solution contains a nitrogen-containing cyclic compound. Such a nonaqueous electrolyte secondary battery is superior in high-temperature storage stability allowing preservation of favorable discharge rate even after high-temperature storage.

5 Claims, 1 Drawing Sheet

NONAQUEOUS ELECTROLYTE SECONDARY BATTERY

BACKGROUND OF THE INVENTION

This application claims priority from Japanese 2007-039326, filed 20 Feb. 2007.

1. Field of the Invention

The present invention relates to a nonaqueous electrolyte secondary battery, in particular to improvement in high-temperature storage stability.

2. Description of the Related Art

In progress of portable electronic devices such as cellphone, laptop computer and personal digital assistants (PDAs), there is a demand for a high-energy-density secondary battery for use as the main or backup power source in these devices. Lithium-ion secondary batteries, which are higher in voltage and energy density, are attracting attention as a secondary battery suitable for such applications.

In addition, lithium-ion secondary batteries currently used as the power source for the portable electronic devices are mainly nonaqueous electrolyte secondary batteries. Such a nonaqueous electrolyte secondary battery is generally produced by forming electrode assembly by winding spirally or laminating a positive electrode containing a lithium atom-containing composite transition metal oxide such as lithium cobaltate ($LiCoO_2$) as the positive electrode active material and a negative electrode containing for example a carbon material as the negative-electrode active material as they face each other via a separator, followed by enclosing the electrode assembly together with a nonaqueous electrolyte solution in a battery case. For example, a porous film of polyethylene or polypropylene has been used as the separator. As the nonaqueous electrolyte solution, a solution dissolving a solute in a nonaqueous solvent is generally used. Examples of the nonaqueous solvents for use include cyclic and linear carbonate esters and the like. Examples of the solutes for use include lithium hexafluorophosphate ($LiPF_6$), lithium tetrafluoroborate ($LiBF_4$) and the like.

For improvement of battery characteristics, there have been many studies aimed at improvement of the components for the nonaqueous electrolyte secondary battery: positive electrode, negative electrode, separator, nonaqueous electrolyte solution, and others.

Known as an example of the nonaqueous electrolyte secondary battery having improved positive and negative electrodes is a nonaqueous electrolyte secondary battery having a porous protective film in which a coating film containing a resin binder and solid fine particles is formed on the surface of the active material layer of the positive or negative electrode (see, for example, Japanese Patent No. 3371301). Japanese Patent No. 3371301 above discloses that, by forming the porous protective film on the surface of the active material layer of positive or negative electrode, it is possible to prevent separation and re-deposition of the active material particles during production of the battery and thus to prevent internal short circuiting induced by the re-deposited active material particles.

Known as an example of the nonaqueous electrolyte secondary battery having an improved separator is a nonaqueous electrolyte secondary battery having a separator consisting of a layer containing a heat-resistant nitrogen-containing aromatic polymer such as aramide and a ceramic powder, and a laminated porous film made of a thermoplastic resin (see, for example, Japanese Patent No. 3175730). Japanese Patent No. 3175730 above discloses that the porous film melts, leading to shutdown of blocking the current when the battery temperature rises for example by trouble such as overcharge and that, even when the battery temperature rises further, it is possible to prevent generation of large holes in the separator to prevent meltdown thereof, because the layer containing a heat-resistant nitrogen-containing aromatic polymer and a ceramic powder is resistant to melting. Thus, Japanese Patent No. 3175730 discloses the nonaqueous electrolyte secondary battery favorable both in shutdown capability and meltdown resistance and thus higher in safety.

Known as an example of the nonaqueous electrolyte secondary battery having an improved electrolyte solution is a nonaqueous electrolyte secondary battery having a nonaqueous electrolyte solution containing an aromatic compound such as pyrrole. (see, for example, Japanese Unexamined Patent Publication No. 2002-270226). Disclosed in Japanese Unexamined Patent Publication No. 2002-270226 is that use of such an electrolyte solution is effective in providing favorable cycle characteristics, because it leads to generation of a cover layer on the surface of the active material particles, preventing direct contact between the electrode active material and the electrolyte solution and disturbing the reaction between lithium (Li) and the electrolyte solution during charge and discharge.

However, in the nonaqueous electrolyte secondary batteries described in Japanese Patent Nos. 3371301 and 3175730 and Japanese Unexamined Patent Publication No. 2002-270226, the positive-electrode active material layer containing a transition metal oxide releases the transition metal as a metal cation during high-temperature storage. The released metal cation deposits as metal on the negative electrode, often raising the impedance of the negative electrode and causing clogging in the separator. These nonaqueous electrolyte secondary batteries were thus, still unsatisfactory in high-temperature storage stability, because of the deterioration in discharge rate characteristics caused by such troubles after high-temperature storage.

SUMMARY OF THE INVENTION

An object of the present invention, which was made to solve the traditional problems above, is to provide a nonaqueous electrolyte secondary battery superior in high-temperature storage stability allowing preservation of favorable discharge rate even after high-temperature storage.

An aspect of the present invention is a nonaqueous electrolyte secondary battery, comprising a positive electrode having a positive-electrode active material layer reversibly inserting and extracting lithium ions on a positive-electrode current collector, a negative electrode having a negative-electrode active material layer reversibly inserting and extracting lithium ions on a negative-electrode current collector, and a nonaqueous electrolyte solution, wherein at least one of the positive and negative electrodes has a film on the surface and at least one of the positive electrode, the negative electrode and the nonaqueous electrolyte solution contains a nitrogen-containing cyclic compound.

Another aspect of the present invention is a nonaqueous electrolyte secondary battery, comprising a positive electrode having a positive-electrode active material layer reversibly inserting and extracting lithium ions on a positive-electrode current collector, a negative electrode having a negative-electrode active material layer reversibly inserting and extracting lithium ions on a negative-electrode current collector, a separator placed between the positive and negative electrodes, and a nonaqueous electrolyte solution, wherein the separator comprises a material containing an element high in electronegativity or an electron-withdrawing substituent group and at least one of the positive electrode, the negative electrode and the nonaqueous electrolyte solution contains a nitrogen-containing cyclic compound.

The objects, characteristics, aspects, and advantages of the present invention will become more evident in the following detailed description and the drawings attached.

DETAILED DESCRIPTION OF THE INVENTION

Hereinafter, favorable embodiments of the present invention will be described. The following embodiments are only specific examples of the present inventions, and should not be construed that they restrict the technological scope of the present invention.

In an embodiment of an aspect of the present invention, the nonaqueous electrolyte secondary battery comprises a positive electrode having a positive-electrode active material layer reversibly inserting and extracting lithium ions on a positive-electrode current collector, a negative electrode having a negative-electrode active material layer reversibly inserting and extracting lithium ions on a negative-electrode current collector, and a nonaqueous electrolyte solution, wherein at least one of the positive and negative electrodes has a film on the surface and at least one of the positive electrode, the negative electrode and the nonaqueous electrolyte solution contains a nitrogen-containing cyclic compound.

After intensive studies, the inventors have found that, by an action of the film formed on the electrode surface in cooperation with a polymeric film derived from the nitrogen-containing cyclic compound, the films formed on the positive electrode surface inhibit elution of the metal cations from the positive-electrode active material layer, while the films formed on the negative electrode surface inhibit deposition of the metal cations as metal on the negative electrode surface.

The actions above seem to proceed in the following way: The nitrogen-containing cyclic compound first forms the polymeric film on the surface of the electrodes, namely positive and negative electrodes. The nitrogen atoms in the polymeric film are high in electron density. Metal cations low in electron density are thus trapped in the region between the polymeric film containing the nitrogen atoms high in electron density and the film on the electrode in contact therewith. Seemingly, the actions are understood as such effect to trap metal.

Because of the metal cation-trapping effect, the nonaqueous electrolyte secondary battery in the present embodiment has excellent high-temperature storage stability allowing preservation of favorable discharge rate even after high-temperature storage.

The film above on the electrode surface is preferably an inorganic oxide-containing film or a polyamide film. Such a film inhibits elution of metal cations from the positive-electrode active material layer and deposition of the metal on the negative electrode surface more efficiently. The reason is explained because the oxygen atoms in the inorganic oxide and the oxygen atoms of the amide bonds in the polyamide film are also high in electronegativity, i.e., high in electron density, similarly to the nitrogen atoms in the polymeric film. Apparently, the film on the electrode and the polymeric film work together to show the metal cation-trapping effect cooperatively and complementarily, by trapping the metal cations not only with the nitrogen atoms but also with the oxygen atoms. That is, the metal cations are seemingly trapped so as to be enclosed in the region between the oxygen atoms in the inorganic oxide-containing film or in the polyamide film and the nitrogen atoms in the polymeric film.

The film above on the electrode surface is preferably a porous film, more preferably a porous inorganic oxide-containing film, and a porous polyamide film. The film, if porous, allows the nonaqueous electrolyte solution to flow in the film and thus, functions as a protective film inhibiting elution of metal cations from the positive-electrode active material layer and deposition of the metal on the negative electrode surface without disturbing the electrode reaction between the lithium ions in the nonaqueous electrolyte solution and the positive and negative electrodes.

The inorganic oxide for use may be a known inorganic oxide. Typical examples of the favorable inorganic oxides include alumina, titania, zirconia, magnesia, silica and the like. The inorganic oxide-containing film formed on the electrode inhibits elution of metal cations from the positive-electrode active material layer and deposition of the metal on the negative electrode surface more efficiently. It is seemingly because the inorganic oxide, which contains oxygen atoms high in electronegativity, i.e., high in electron density, exhibits larger metal cation-trapping effect. Further, the inorganic oxide is also favorable, because it is more chemically stable in the environment using the battery.

The inorganic oxide-containing film may contain only one inorganic oxide or two or more inorganic oxides in combination. The inorganic oxide-containing film may be a single film or a laminated film having multiple layers. In addition, the multilayer film may be a laminate of multiple inorganic oxide-containing films in the same composition or a laminated multilayer film having multiple inorganic oxide-containing films different in composition.

The inorganic oxide-containing film preferably contains as needed a small amount of binder. A known resin binder can be used as the binder for binding the inorganic oxide. Typical favorable examples of the binders include polyvinylidene fluoride (PVDF), polytetrafluoroethylene (PTFE), modified acrylonitrile rubber particles (BM-500B, available from Zeon Corporation), and the like. When PTFE or BM-500B is used, it is desirable to use a thickener such as carboxymethylcellulose (CMC), polyethyleneoxide (PEO) or a modified acrylonitrile rubber (BM-720H, available from Zeon Corporation) in combination.

The inorganic oxide-containing film is formed, for example, by preparing a paste by agitating an inorganic oxide and a binder in an agitator such as double bowl mixer and applying the paste on electrodes for example with a doctor blade or by die coating.

The thickness of the inorganic oxide-containing film is preferably 0.5 to 50 μm. When the inorganic oxide-containing film is too thin, the amount of the inorganic oxide contained in the film may become too low to show the metal cation-trapping effect. Alternatively when the inorganic oxide-containing film is too thick, it widens the space between the positive and negative electrodes excessively, leading to deterioration in output characteristics. The polyamide film is configured to contain a polyamide. The polyamide is preferably an aramide, from the point of chemical stability in the environment using the battery. The polyamide film is prepared, for example, by preparing a paste by adding a solvent and others to a polyamide, similarly to the method of forming an inorganic oxide-containing film, and applying the paste on electrodes.

The thickness of the polyamide film is preferably 0.5 to 50 µm. A polyamide film, when it is too thin, may not show favorable metal cation-trapping effect. Alternatively when too thick, the polyamide film may expand the gap between the positive and negative electrodes excessively, leading to deterioration in output characteristics.

Because a film such as inorganic oxide-containing film or polyamide film is formed on the surface of at least one of the positive and negative electrodes in the present embodiment, it is possible to prevent internal short circuiting even without a separator formed between the positive and negative electrodes.

Even when the film is formed on electrodes as in the present embodiment, there may be a separator additionally formed between the positive and negative electrodes. Because elution of metal cations from the positive-electrode active material layer is inhibited in the present embodiment, there is less clogging of the separator. Accordingly, it is advantageously possible to prevent internal short circuiting between the positive and negative electrodes more effectively without troubles caused by hindered migration of lithium ions due to separator clogging. It is also advantageously possible to allow the separator to have its functions other than prevention of internal short circuiting, such as shutdown capability and meltdown resistance. The separator for use is preferably a porous thin film higher in ion permeability and insulation characteristics and having a particular mechanical strength.

Typical examples of the separators used when a film is formed on electrodes include separators of an olefinic polymer such as polypropylene, polyethylene or a mixture thereof, separators of glass fiber (sheet, nonwoven fabric, and woven fabric), polyamide separators and the like. Even when such a separator is placed between the positive and negative electrodes, it is possible to make the film exhibit the advantageous effects of the present embodiment of inhibiting elution of metal cations from the positive-electrode active material layer and deposition of the metal on the negative electrode surface without any deterioration thereof.

When a polyamide film is formed as the film, use of a polyamide separator is preferable, and when an inorganic oxide-containing film is formed, use of a separator for example of an olefinic polymer or a glass fiber is preferable. The separator is preferably a separator having a shutdown capability of raising its resistance by micropore clogging at a particular temperature, for example, at 120° C. or higher or a separator having additionally meltdown resistance of forming no hole by fusion even heated at an elevated temperature, for example at 200° C. or higher. The thickness of the separator is not particularly limited, but preferably 10 to 300 µm.

In the present embodiment, at least one of the positive electrode, the negative electrode and the nonaqueous electrolyte solution contains a nitrogen-containing cyclic compound. The nitrogen-containing cyclic compound may be any known nitrogen-containing cyclic compound, if it is a nitrogen atom-containing cyclic compound. Typical favorable examples of the nitrogen-containing cyclic compounds include nitrogen-containing cyclic compounds having unsaturated bond(s) in the cyclic ring such as pyrrole, imidazole, thiazole, oxazole, furazan, sydnone, pyrazole, isothiazole, isoxazole, pyrazine, pyridine, pyrimidine, and pyridazine; nitrogen-containing cyclic compounds having no unsaturated bond in the cyclic ring such as piperazine, piperidine, pyrarazine, and morpholine; and the like. The nitrogen-containing cyclic compounds above may be used alone or in combination of two or more. Among them, nitrogen-containing cyclic compounds having unsaturated bond(s) in the cyclic ring are preferable. Such a nitrogen-containing cyclic compound is high in polymerization reactivity and thus, forms a polymeric film high in polymerization degree on the electrode surface. Such a polymeric film is resistant to peeling from the electrode, and thus, the electrode having the polymeric film thus formed inhibits elution of metal cations from the positive-electrode active material layer and deposition of the metal on the negative electrode surface for an extended period of time, consequently giving a nonaqueous electrolyte secondary battery more superior in high-temperature storage stability. Because pyrrole is extremely high in polymerization reactivity, and thus, pyrrole-derived polymeric films are particularly resistant to peeling and thus particularly favorable.

The nitrogen-containing cyclic compound may be contained in the positive electrode or in the negative electrode, or alternatively, in the nonaqueous electrolyte solution. When the nitrogen-containing cyclic compound is contained in the positive electrode or negative electrode, it may be bonded to the surface of the positive-electrode active material layer or the negative-electrode active material layer, or may be added to the positive or negative electrode mixture during preparation of the electrode plate. The nitrogen-containing cyclic compound contained in one electrode may dissolve into the nonaqueous electrolyte solution to some extent and reach the other counter electrode, for example causing polymerization on the other electrode. For that reason, the electrode containing the nitrogen-containing cyclic compound and the electrode having the inorganic oxide-containing film may be the same as or different from each other, but the electrode containing the nitrogen-containing cyclic compound is preferably the same as the electrode having the inorganic oxide-containing film formed.

When the nonaqueous electrolyte solution contains a nitrogen-containing cyclic compound, the nitrogen-containing cyclic compound is preferably contained in an amount of 0.1 to 10 parts by mass, with respect to 100 parts by mass of the nonaqueous solvent described below. An excessively low content of the nitrogen-containing cyclic compound may lead to deterioration of the effect of adding the nitrogen-containing cyclic compound, while an excessively high content of the nitrogen-containing cyclic compound, which for example leads to thickening of the polymeric film formed on the electrode surface, may inhibit the electrode reaction between the lithium ions in the nonaqueous electrolyte solution and the electrodes, making insertion and extraction of lithium ion into and from the electrodes difficult.

The positive electrode has a positive-electrode active material layer on a positive-electrode current collector. The positive-electrode active material layer is prepared, for example, by applying a positive electrode mixture obtained by mixing a positive electrode active material, a binder as needed, and a conductive substance on a positive-electrode current collector. The positive electrode mixture may be, for example, in a paste or slurry state containing a solvent.

The positive electrode active material may be any known composite transition metal oxide, if it is a composite transition metal oxide capable of inserting and extracting lithium ions reversibly. Typical favorable examples of the positive electrode active materials include lithium-containing composite transition metal oxides such as $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, and $Li_xMn_{2-y}M_yO_4$ (wherein, M represents at least one of Na, Mg, Sc, Y, Mn, Fe, Co, Ni, Cu, Zn, Al, Cr, Pb, Sb and B; x=0 to 1.2; y=0 to 0.9; and z=2.0 to 2.3), and the like. The value x is a value before charge and discharge, which varies by charge and discharge. The positive electrode active materials above may be used alone or in combination of two or more.

The binder may be any one of known resin binders. Typical favorable examples of the binders include polyolefins such as polyethylene (PE) and polypropylene (PP); fluorine-containing resins such as polytetrafluoroethylene (PTFE), polyvinylidene fluoride (PVDF), tetrafluoroethylene-hexafluoroethylene copolymers, tetrafluoroethylene-hexafluoropropylene copolymers (FEP), vinylidene fluoride-hexafluoropropylene copolymers, tetrafluoroethylene-perfluoroalkyl vinylether copolymers (PFA), vinylidene fluoride-hexafluoropropylene copolymers, vinylidene fluoride-chlorotrifluoroethylene copolymers, ethylene-tetrafluoroethylene copolymers (ETFE), polychloro-trifluoroethylene (PCTFE), vinylidene fluoride-pentafluoropropylene copolymers, propylene-tetrafluoroethylene copolymers, ethylene-chlorotrifluoroethylene copolymers (ECTFE), vinylidene fluoride-hexafluoropropylene-tetrafluoroethylene copolymers, and vinylidene fluoride-perfluoromethylvinylether-tetrafluoroethylene copolymers; carboxymethylcellulose (CMC) and the like. Among them, fluorine-containing resins are preferable from the points of heat and chemical resistance, and PVDF and PTFE are particularly preferable. The binders above may be used alone or in combination of two or more.

The conductive substance may be any one of known conductive substances, as long as a conductive substance causes no chemical change in the battery prepared such a configuration. Typical favorable examples of the conductive substances include graphites such as natural graphites (scaly graphite, etc.) and man-made graphites; carbon blacks such as acetylene black (AB), Ketjen black, channel black, furnace black, lamp black and thermal black; conductive fibers such as carbon fiber and metal fibers; conductive powders such as of carbon fluoride, copper, nickel, aluminum and silver; conductive whiskers such as of zinc oxide and potassium titanate; conductive metal oxides such as titanium oxide, organic conductive materials such as polyphenylene derivatives; and the like. Among them, man-made graphite and acetylene black are particularly preferable. The conductive substances above may be used alone or in combination of two or more as the conductive substance. Presence of the conductive substance is advantageous for acceleration of the electrode reaction between the lithium ions in the nonaqueous electrolyte solution and the positive electrode.

The solvent for the positive electrode mixture may be any solvent, if it contains substantially no water. Typical favorable examples of the solvents include dehydrated N-methyl-2-pyrrolidone (NMP) and the like. A substantially water-free solvent is used, because the positive electrode active material is fragile to water and generates hydrogen fluoride and others by decomposition with water.

Any known positive-electrode current collector may be used as the positive-electrode current collector. Typical favorable examples of the positive-electrode current collectors include sheets and foils such as of stainless steel, aluminum, or titanium, and the like. The thickness of the positive-electrode current collector is not particularly limited, but preferably 1 to 500 µm.

The negative electrode has a negative-electrode active material layer on a negative-electrode current collector. The negative-electrode active material layer is prepared, for example, by applying a negative electrode mixture obtained by mixing a negative-electrode active material, a binder as needed, and a conductive substance on a negative-electrode current collector. The negative electrode mixture is, for example, in a paste or slurry state containing a solvent.

The negative-electrode active material may be any one of known negative-electrode active materials, if it can insert and extract lithium ions reversibly. Typical favorable examples of the negative-electrode active materials include carbon materials, lithium metal, lithium-containing composite oxides, and lithium alloys, metal fibers, lithium nitride and the like. Examples of the carbon materials include graphites such as natural graphites (scaly graphite, etc.) and man-made graphites; carbon blacks such as acetylene black, Ketjen black, channel black, furnace black, lamp black and thermal black; coke, pyrolytic carbons, mesocarbon microbeads, graphitized mesophase spheres, gas-phase-growth carbon, glassy carbons, carbon fibers (polyacrylonitrile-based, pitch-based, cellulosic, and gas phase growth carbon-based), undefined carbons, organic matter-baked carbon materials, and the like. The materials forming an alloy with lithium include pure silicon, silicon oxide ($SiO_x$), tin, and the like. The negative-electrode active materials may be used alone or in combination of two or more as the negative-electrode active material.

A binder similar to that used for the positive electrode mixture may be used as the binder for the negative electrode mixture. In addition, a conductive substance similar to that used in the positive electrode mixture may be used as the conductive substance in the negative electrode mixture.

The negative-electrode current collector for use may be any one of known negative-electrode current collectors. Typical favorable examples of the negative-electrode current collectors include sheets and foils such as of stainless steel, nickel, or copper, and the like. The thickness of the negative-electrode current collector is not particularly limited, but preferably 1 to 500 µm.

The nonaqueous electrolyte solution may be any one of known nonaqueous electrolyte solutions, if it is a nonaqueous electrolyte solution showing lithium ion conductivity, and examples thereof include solutions including a nonaqueous solvent and a lithium salt. Typical favorable examples of the nonaqueous solvents include cyclic carbonate esters (cyclic carbonates), linear carbonate esters (non-cyclic carbonates), cyclic carboxylate esters, cyclic sulfones and the like. Typical examples of the cyclic carbonate esters include ethylene carbonate (EC), propylene carbonate (PC), butylene carbonate (BC) and the like. Typical examples of the linear carbonate esters include dimethyl carbonate (DMC), diethyl carbonate (DEC), ethyl methyl carbonate (EMC), dipropyl carbonate (DPC) and the like. Typical examples of the cyclic carboxylate esters include γ-butylolactone (GBL), γ-valerolactone (GVL) and the like. Typical examples of the cyclic sulfones include sulfolane (SL), 3-methylsulfolane (3MeSL) and the like. Among them, it is preferably at least one compound selected from EC, PC and SL. In this way, it is possible to produce a nonaqueous electrolyte secondary battery superior in high-temperature storage stability. The nonaqueous solvents above may be used alone or in combination of two or more as the nonaqueous solvent.

The lithium salt may be any one of known lithium salts. Typical favorable examples of the lithium salts include $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, lithium lower aliphatic carboxylates, LiCl, LiBr, LiI, borate salts such as bis(1,2-benzenedioleate(2-)-O,O') lithium borate, bis(2,3-naphthalenedioleate(2-)-O,O') lithium borate, bis(2,2'-biphenyldioleate (2-)-O,O') lithium borate and bis(5-fluoro-2-oleate-1-benzenesulfonate-O,O') lithium borate; imide salts such as lithium bistetrafluoromethanesulfonimide (($CF_3SO_2)_2NLi$), lithium nonafluorobutanesulfonate and tetrafluoromethanesulfonimide ($LiN(CF_3SO_2)(C_4F_9SO_2)$) and lithium bispentafluoroethanesulfonimide (($C_2F_5SO_2)_2NLi$); and the like. Among them, $LiPF_6$ is more preferable. The lithium salts above may be used alone or in combination of two or more as the lithium salt. The amount of the lithium salt added is not particularly limited, but preferably 0.2 to 2 mol/L, more preferably 0.5 to 1.5 mol/L.

The combination of the nonaqueous solvent and the lithium salt is not particularly limited, but a nonaqueous electrolyte solution containing at least EC as the nonaqueous solvent and at least $LiPF_6$ as the lithium salt is preferable.

The nonaqueous electrolyte solution may contain additionally a cyclic carbonate ester having at least one carbon-carbon unsaturated bond. The cyclic carbonate ester having at least one carbon-carbon unsaturated bond decomposes on the negative electrode to form a film higher in lithium ion conductivity and raises the coulombic efficiency.

The cyclic carbonate ester having at least one carbon-carbon unsaturated bond may be any one of known cyclic carbonate esters, if it has at least one carbon-carbon unsaturated bond. Typical favorable examples of the cyclic carbonate esters include vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinylethylene carbonate (VEC), divinylethylene carbonate and the like. Among them, at least one compound selected from the group consisting of vinylene carbonate, vinylethylene carbonate, and divinylethylene carbonate is preferable. These compounds may be used alone or in combination of two or more. Hydrogen atoms in each of the cyclic carbonate esters may be partly substituted with fluorine atoms.

In addition, the nonaqueous electrolyte solution may contain additionally a known benzene derivative inactivating the battery by forming a film on the electrode by decomposition during overcharge. The benzene derivative preferably has a phenyl group and a cyclic compound group close to the phenyl group. Typical examples of the cyclic compound groups include phenyl, cyclic ether, cyclic ester, cycloalkyl and phenoxy groups, and the like. Typical examples of the benzene derivatives include cyclohexylbenzene, biphenyl, diphenylether and the like. These compounds may be used alone or in combination of two or more. However, the content of the benzene derivatives is 10 volume parts or less with respect to 100 volume parts of the nonaqueous solvent.

The nonaqueous electrolyte secondary battery in the present embodiment is assembled by winding or laminating positive and negative electrodes as well as a separator placed as needed between them, placing the wound or laminated electrode assembly into a battery case, filling a nonaqueous electrolyte solution therein, and sealing the battery case. Specifically, the battery has, for example, the following configuration.

Figure 1:
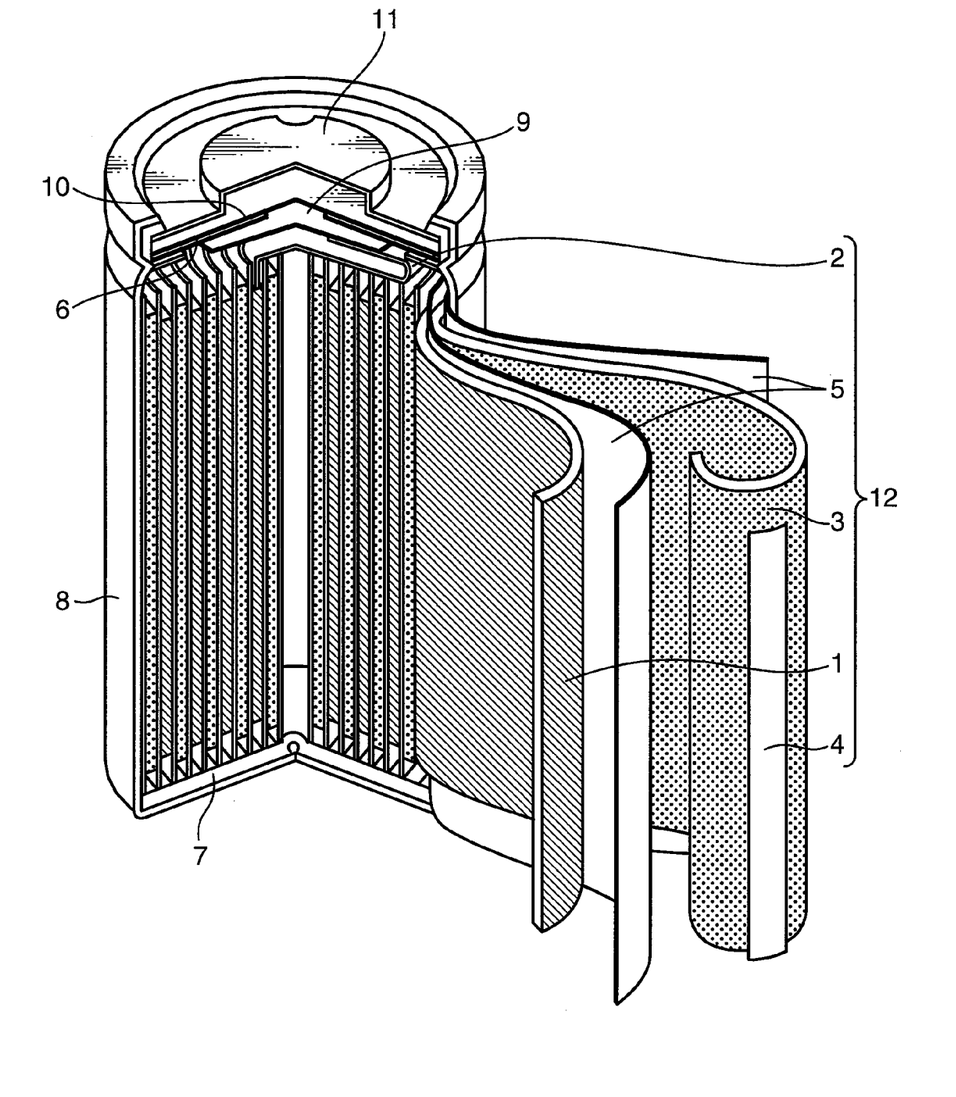
FIG. 1 is a schematic sectional view illustrating an example of the nonaqueous electrolyte secondary battery in an embodiment of the present invention.

FIG. 1 is a schematic sectional view illustrating an example of the nonaqueous electrolyte secondary battery in an embodiment of the present invention. The nonaqueous electrolyte secondary battery has a configuration including electrode assembly 12 and a nonaqueous electrolyte solution not shown in the FIGURE placed in a battery case 8 that is sealed by a sealing plate 10. The electrode assembly 12 has a structure having electrodes (electrode plates), a sheet-shaped positive electrode (positive electrode plate) 1 having a positive electrode lead 2 and a sheet-shaped negative electrode (negative electrode plate) 3 having a negative electrode lead 4, that are wound spirally via a separator 5. A top insulation plate 6 is placed on the top of the electrode assembly 12 and a bottom insulation plate 7 on the bottom of the electrode assembly. The sealing plate 10 has a gasket 9 and a positive electrode terminal 11.

In an embodiment of another aspect of the present invention, provided is a nonaqueous electrolyte secondary battery similar to that in the embodiment above, except that a separator comprising a material containing an element high in electronegativity or an electron-withdrawing substituent group is placed between the positive and negative electrodes, replacing the film formed on at least one surface of the positive and negative electrodes. Thus, the nonaqueous electrolyte secondary battery comprises a positive electrode having a positive-electrode active material layer reversibly inserting and extracting lithium ions on a positive-electrode current collector, a negative electrode having a negative-electrode active material layer reversibly inserting and extracting lithium ions on a negative-electrode current collector, a separator placed between the positive and negative electrodes, and a nonaqueous electrolyte solution, wherein the separator comprises a material containing an element high in electronegativity or an electron-withdrawing substituent group, and at least one of the positive electrode, the negative electrode and the nonaqueous electrolyte solution contains a nitrogen-containing cyclic compound.

After intensive studies, the inventors have found that, by a cooperactive action of the separator made of a material containing an element high in electronegativity or an electron-withdrawing substituent group and the polymeric film derived from nitrogen-containing cyclic compound, the side of the separator in contact with the positive electrode surface allows to inhibit elution of metal cations from the positive-electrode active material layer, while the side of the separator in contact with the negative electrode surface allows to inhibit deposition of the metal cations as metal on the negative electrode surface.

The actions above seem to proceed in the following way: The nitrogen-containing cyclic compound first forms the polymeric film on the surface of the electrodes, namely positive and negative electrodes. There are portions (elements or substituent groups) high in electron density in the separator made of a material containing an element high in electronegativity or an electron-withdrawing substituent group. Metal cations low in electron density are thus trapped in the region between the polymeric film containing the nitrogen atoms high in electron density and the separator. Seemingly, the actions are understood as such effect to trap metal.

Because of the metal cation-trapping effect, the nonaqueous electrolyte secondary battery in the present embodiment shows favorable high-temperature storage stability allowing preservation of favorable discharge rate even after high-temperature storage.

Examples of elements high in electronegativity contained in the separator include N, O, F, S, Cl and the like. Examples of the electron-withdrawing substituent groups include —CN, —SO$_2$—, —CO—, —COO—, —CF$_3$ and the like.

The separator is preferably an inorganic oxide-containing separator or a polyamide separator. Such a separator inhibits elution of metal cations from the positive-electrode active material layer and deposition of the metal on the negative electrode surface more effectively. The reason is explained because the oxygen atoms in the inorganic oxide and the oxygen atoms of the amide bonds in the polyamide separator are also high in electronegativity, i.e., high in electron density, similarly to the nitrogen atoms in the polymeric film. Apparently, the separator and the polymeric film work together to show the metal cation-trapping effect cooperatively and complementarily, by trapping the metal cations not only with the nitrogen atoms but also with the oxygen atoms. That is, the metal cations are seemingly trapped so as to be enclosed in the region between the oxygen atoms in the inorganic oxide-containing separator or in the polyamide separator and the nitrogen atoms in the polymeric film.

Hereinafter, an example of the method of producing the separator comprising a material containing an element high in electronegativity or an electron-withdrawing substituent group will be described. A material (polymer) containing an element high in electronegativity or an electron-withdrawing substituent group is mixed with an organic solvent, and the polymer is dissolved, melted, kneaded, and extruded. Then, the molded article is drawn, processed for removal of organic solvent, dried, and heat-set, to give a separator.

The separator comprising a material containing an element high in electronegativity or an electron-withdrawing substituent group is prepared specifically, for example, by the following method.

First, a material containing an element high in electronegativity or an electron-withdrawing substituent group is mixed with a good solvent for the material, to give a solution of the material. The material is not particularly limited, if it is a material containing an element high in electronegativity or an electron-withdrawing substituent group, and examples thereof include materials containing one or more elements or groups selected from elements high in electronegativity, electron-withdrawing substituent groups and the like. Typical favorable examples of the materials include resins containing an inorganic oxide such as alumina, titania, zirconia, magnesia or silica; polyamide resins; and the like.

The material solution can be prepared, for example, by dissolving the material in a particular solvent under heat (heating solubilization). The solvent is not particularly limited, if it dissolves the material sufficiently. Favorable examples of the solvents include aliphatic or cyclic hydrocarbons such as nonane, decane, undecane, dodecane, and liquid paraffin; mineral oil fractions having a boiling point similar to that of the hydrocarbons above; and the like. For stabilization of the gel-shaped molding obtained after extrusion molding, use of a nonvolatile solvent such as liquid paraffin is preferable.

The heating solubilization may be carried out, while the material is agitated in a solvent at a temperature allowing complete solubilization or in an extruder as mixed uniformly. The temperature when the material is dissolved in a solvent while agitated may be altered according to the kinds of the material and the solvent used, but is normally in the range of 140 to 250° C.

In the case of solubilization in an extruder, the material is first supplied into the extruder, allowing melting. The melting temperature varies according to the kind of the material, but is preferably a temperature of the melting point plus 30 to 100° C. Then, a particular solvent is supplied from a particular position of the extruder to the material in the molten state. In this way, it is possible to obtain a solution containing the molten material.

Then, the solution is extruded through a die out of the extruder into a sheet-shaped article, which is then cooled to give a gel composition. When the material solution is prepared in an extruder, the solution may be extruded out of the extruder through a die or may be fed into another extruder and extruded through the die therein.

Subsequently, the gel composition obtained is then cooled, to give a gel molding. The cooling is made by cooling the die or by cooling the gel sheet. The cooling is made, for example, at a cooling rate of 50° C./minute at least preferably to 90° C. or lower, more preferably to 80 to 30° C. The gel composition may be cooled, for example, by a direct-contact method of using cooling air, cooling water or other cooling medium, or by an indirect-contact method, for example, of using a refrigerant-cooled roll. Among the methods above, the method of using a chill roll is preferable.

The gel molding is then biaxially stretched, to give a molding. The stretching is performed by a common tenter method, roll method, rolling, or a combination thereof at a particular stretching rate while the gel molding is heated. The biaxial stretching may be simultaneous or sequential biaxial stretching, but the simultaneous biaxial stretching is preferable.

The molding obtained is washed with a cleaner, and the residual solvent is removed. The cleaner for use is an easily volatile solvent, and examples thereof include hydrocarbons such as pentane, hexane and heptane; chlorinated hydrocarbons such as methylene chloride and carbon tetrachloride; fluorohydrocarbons such as ethane trifluoride; ethers such as diethylether and dioxane; and the like. These cleaners may be used alone or in combination of two or more. These cleaners are selected properly according to the solvent used for solubilization of the materials described above.

The molding is cleaned, for example, by a method of immersing the molding in a particular solvent for removal of residual solvent, a method of spraying a cleaner on the molding, or a method in combination thereof.

The molding is preferably cleaned until the content the residual solvent in the molding becomes less than 1 mass %.

The molding is then dried for removal of the cleaner. The drying can be performed, for example, by heat drying or air drying.

Finally, the resulting dry molding is heat-set at a temperature of 100° C. or higher, to give a separator of high-strength microporous film.

The nonaqueous electrolyte secondary battery according to the invention is applicable in wide applications in various shapes and dimensions such as coin-type, button-type, sheet-shaped, laminate, cylindrical, flat, and square batteries and also as large batteries used for example in electric vehicles.

In addition, the nonaqueous electrolyte secondary battery according to the invention can also be used in portable information systems, portable electronic devices, home-use small power-storing apparatuses, autobikes, electric and hybrid electric vehicles, and others, but the application thereof is not limited thereto.

In the present invention described so far in details, all description is provided here only to illustrate the present invention by way of exemplary embodiments, and thus the present invention is not limited thereto. It should be understood that numerous modifications not exemplified here are also possible in the scope of the present invention.

Hereinafter, the present invention will be described with reference to Examples, but it should be understood that the present invention is not restricted these Examples.

EXAMPLES

Hereinafter, favorable embodiments (nonaqueous electrolyte secondary batteries) of the present invention will be described with reference to Examples.

Example 1

Positive Electrode 10 parts by mass of a conductive substance acetylene black and 5 parts by mass of a binder polyvinylidene fluoride resin were mixed with 85 parts by mass of lithium cobaltate ($LiCoO_2$) powder, and the mixture was dispersed in dehydrated N-methyl-2-pyrrolidone (dehydrated NMP), to give a positive electrode mixture slurry. The positive electrode mixture was coated on a positive-electrode current collector of aluminum foil; the foil was, after drying, rolled, to give a sheet-shaped positive electrode having the positive-electrode active material layer laminated.

(Negative Electrode)

1 part by mass of a binder polyethylene resin and 1 part by mass of a thickener carboxymethylcellulose were mixed with 100 parts by mass to a man-made graphite powder; and the mixture was dispersed in water, to give a negative-electrode mixture slurry. The negative electrode mixture was coated on a negative-electrode current collector of copper foil, and the foil is, after drying, rolled, to give a sheet-shaped negative electrode having the negative-electrode active material layer laminated.

(Nonaqueous Electrolyte Solution)

$LiPF_6$ was dissolved in a mixed solvent of EC and EMC (volume ratio: 1:4) (electrolyte solution solvent) at a concentration of 1 mol/L. Each nitrogen-containing cyclic compound described in Table 1 was added to the solution obtained in an amount of 2 parts by mass, with respect to 100 parts by mass of the electrolyte solution solvent, to give a nonaqueous electrolyte solution.

(Separator)

The separator used was a polyethylene separator.

(Porous Protective Film)

970 g of alumina (median diameter: 0.3 μm), 375 g of a solution containing a polyacrylonitrile-modified rubber binder (BM-720H, manufactured by Zeon Corporation) (solid matter: 8 parts by mass), and a suitable amount of NMP were agitated in a double shaft blender, to give a paste. The paste was applied on each face of the negative-electrode active material layer of a negative electrode to a thickness of 5 μm, and the film was dried at 120° C. under vacuum for 10 hours, to form a porous protective film.

(Nonaqueous Electrolyte Secondary Battery)

A nonaqueous electrolyte secondary battery was prepared by using the positive electrode, the negative electrode having a porous protective film, the nonaqueous electrolyte solution, and the separator, in the following manner:

Part of the positive-electrode active material layer on the positive electrode was removed, and a positive electrode lead of aluminum was connected thereto. Part of the negative-electrode active material layer on the negative electrode was removed, and a negative electrode lead of nickel was connected thereto. The positive and negative electrodes were wound spirally via a separator, to give the electrode assembly. A top insulation plate of PP is placed on top of the electrode assembly and a bottom insulation plate of PP on the bottom of the electrode assembly, and the electrode assembly was inserted in a cylindrical battery case of nickel-plated iron having a diameter of 18 mm and a height of 65 mm. After each of the nonaqueous electrolyte solutions is filled into the battery case, the opening was sealed with a sealing plate having a gasket and a positive electrode terminal, to give each nonaqueous electrolyte secondary battery (Examples 1-1 to 1-17).

Comparative Example 1

Comparative Example 1-1

Comparative Example 1-1 was carried out similarly to Example 1, except that the nonaqueous electrolyte solution contained no nitrogen-containing cyclic compound and no porous protective film was formed.

Comparative Example 1-2

Comparative Example 1-2 was carried out similarly to Example 1, except that the nonaqueous electrolyte solution contained no nitrogen-containing cyclic compound.

Comparative Example 1-3

Comparative Example 1-3 was carried out similarly to Example 1, except that no porous protective film was formed.

<Evaluation>

Each of the nonaqueous electrolyte secondary batteries of Example 1 and Comparative Example 1 was evaluated by the methods below:

(Metal Elution Amount)

Each nonaqueous electrolyte secondary battery was charged at a constant voltage of 4.2 V and stored in the open-circuit state under a high-temperature environment (85° C.) for 72 hours. After storage, the battery was disassembled, and the center of the negative electrode was cut into a test piece of 2 cm×2 cm, which was then washed three times with EMC. The cutoff sample negative electrode was dissolved under heat by addition of acid; the insoluble matter was removed by filtration; the volume of the filtrate was determined; the metal elution amount (Co concentration in this case) in the sample thus obtained was determined quantitatively by ICP emission spectral analysis by using VISTA-RL, VARIAN. The measured metal elution amount was converted to a value per sample negative electrode mass. Results are summarized in Table 1.

(Capacity Recovery Rate)

The 1C discharge capacity of each nonaqueous electrolyte secondary battery at 20° C. before and after storage at high-temperature (in an environment at 85° C. for 72 hours) was determined; and the rate of discharge capacity after storage with respect to that before storage was determined and used as the capacity recovery rate after high-temperature storage. Results are summarized in Table 1.

The charge mode was a constant-current constant-voltage charge at a maximum current of 1,050 mA and a maximum voltage of 4.2 V for 2 hours and 30 minutes. Alternatively, the discharge mode was a constant-current discharge at a discharge current 1C of 1,500 mA and a discharge-terminating voltage of 3.0 V.

TABLE 1

| | NITROGEN-CONTAINING CYCLIC COMPOUND | | POROUS PROTECTIVE FILM | METAL ELUTION AMOUNT (μg/g) | CAPACITY RECOVERY RATE (%) |
|---|---|---|---|---|---|
| | COMPOUND NAME | UNSATURATED BOND | | | |
| EXAMPLE1-1 | PYRROLE | YES | YES | 6.2 | 86.8 |
| EXAMPLE1-2 | IMIDAZOLE | | | 8.4 | 84.5 |
| EXAMPLE1-3 | THIAZOLE | | | 9.2 | 83.0 |
| EXAMPLE1-4 | OXAZOLE | | | 9.0 | 83.3 |
| EXAMPLE1-5 | FURAZAN | | | 8.8 | 83.2 |
| EXAMPLE1-6 | SYDNONE | | | 9.1 | 83.1 |
| EXAMPLE1-7 | PYRAZOLE | | | 8.5 | 84.4 |

TABLE 1-continued

| | NITROGEN-CONTAINING CYCLIC COMPOUND | | POROUS PROTECTIVE FILM | METAL ELUTION AMOUNT (μg/g) | CAPACITY RECOVERY RATE (%) |
|---|---|---|---|---|---|
| | COMPOUND NAME | UNSATURATED BOND | | | |
| EXAMPLE1-8 | ISOTHIAZOLE | | | 9.6 | 82.5 |
| EXAMPLE1-9 | ISOXAZOLE | | | 9.5 | 82.8 |
| EXAMPLE1-10 | PYRAZINE | | | 9.3 | 83.0 |
| EXAMPLE1-11 | PYRIDINE | | | 9.6 | 82.6 |
| EXAMPLE1-12 | PYRIMIDINE | | | 9.4 | 82.8 |
| EXAMPLE1-13 | PYRIDAZINE | | | 9.5 | 82.6 |
| EXAMPLE1-14 | PIPERAZINE | NO | | 12 | 80.9 |
| EXAMPLE1-15 | PIPERIDINE | | | 12 | 80.8 |
| EXAMPLE1-16 | PYRARAZINE | | | 13 | 80.4 |
| EXAMPLE1-17 | MORPHOLINE | | | 14 | 80.3 |
| COMPARATIVE EXAMPLE1-1 | — | — | NO | 35 | 52.1 |
| COMPARATIVE EXAMPLE1-2 | — | — | YES | 25 | 63.0 |
| COMPARATIVE EXAMPLE1-3 | PYRROLE | YES | NO | 33 | 54.5 |

As obvious from Table 1, presence of a nitrogen-containing cyclic compound in the nonaqueous electrolyte solution and a porous protective film formed on the negative electrode surface (Example 1) is effective in giving a battery resistant to deposition of the metal contained in the positive-electrode active material layer on the negative electrode even after high-temperature storage, having a favorable capacity recovery rate, and having high-temperature storage stability allowing preservation of the discharge characteristics. It is obvious when Example 1 is compared with a case where no nitrogen-containing cyclic compound is contained (Comparative Example 1-2), a case where no porous protective film is formed (Comparative Example 1-3) and a case where no nitrogen-containing cyclic compound is contained and no porous protective film is formed (Comparative Example 1-1).

In addition, comparison between Example 1-1 and Comparative Example 1-3 shows that it is not possible to obtain favorable high-temperature storage stability even when the nonaqueous electrolyte solution contains pyrrole, if no porous protective film is formed on the electrode surface. It is not possible to obtain a nonaqueous electrolyte secondary battery superior in high-temperature storage stability by the invention of Japanese Unexamined Patent Publication No. 2002-270226 wherein no porous protective film is formed on the electrode surface, and thus, the invention is insufficient from the point of improvement in high-temperature stability.

Alternatively, comparison of Examples 1-1 to 1-13 with Examples 1-14 to 1-17, which are similar to each other except that the nitrogen-containing cyclic compound has no unsaturated bond in the cyclic ring, reveals that the nitrogen-containing cyclic compound is more preferably a nitrogen-containing cyclic compound having an unsaturated bond in the cyclic ring.

Example 2

Example 2 was carried out similarly to Example 1, except that a polyamide separator was used instead of forming a porous protective film on the surface of the negative-electrode active material layer.

Comparative Example 2

Comparative Example 2 was carried out similarly to Example 2, except that the nonaqueous electrolyte solution contained no nitrogen-containing cyclic compound.

The samples of Example 2 and Comparative Example 2 were also evaluated similarly. Results are summarized in Table 2.

TABLE 2

| | NITROGEN-CONTAINING CYCLIC COMPOUND | | POLYAMIDE SEPARATOR | METAL ELUTION AMOUNT (μg/g) | CAPACITY RECOVERY RATE (%) |
|---|---|---|---|---|---|
| | COMPOUND NAME | UNSATURATED BOND | | | |
| EXAMPLE2-1 | PYRROLE | YES | YES | 7.0 | 85.7 |
| EXAMPLE2-2 | IMIDAZOLE | | | 8.8 | 83.4 |
| EXAMPLE2-3 | THIAZOLE | | | 9.9 | 82.0 |
| EXAMPLE2-4 | OXAZOLE | | | 9.6 | 82.3 |
| EXAMPLE2-5 | FURAZAN | | | 9.3 | 82.5 |
| EXAMPLE2-6 | SYDNONE | | | 9.8 | 82.2 |
| EXAMPLE2-7 | PYRAZOLE | | | 9.2 | 83.1 |
| EXAMPLE2-8 | ISOTHIAZOLE | | | 11 | 81.9 |
| EXAMPLE2-9 | ISOXAZOLE | | | 10 | 82.2 |
| EXAMPLE2-10 | PYRAZINE | | | 10 | 82.3 |
| EXAMPLE2-11 | PYRIDINE | | | 11 | 81.6 |
| EXAMPLE2-12 | PYRIMIDINE | | | 11 | 81.7 |
| EXAMPLE2-13 | PYRIDAZINE | | | 11 | 81.5 |
| EXAMPLE2-14 | PIPERAZINE | NO | | 13 | 80.4 |
| EXAMPLE2-15 | PIPERIDINE | | | 13 | 80.5 |
| EXAMPLE2-16 | PYRARAZINE | | | 14 | 80.1 |

TABLE 2-continued

| | NITROGEN-CONTAINING CYCLIC COMPOUND | | | METAL ELUTION | CAPACITY RECOVERY |
|---|---|---|---|---|---|
| | COMPOUND NAME | UNSATURATED BOND | POLYAMIDE SEPARATOR | AMOUNT (µg/g) | RATE (%) |
| EXAMPLE2-17 | MORPHOLINE | | | 15 | 80.0 |
| COMPARATIVE EXAMPLE2 | — | — | | 31 | 58.1 |

As obvious from Table 2, presence of a nitrogen-containing cyclic compound in the nonaqueous electrolyte solution and a polyamide separator placed between the positive and negative electrodes (Example 2) is effective in giving a battery resistant to deposition f the metal contained in the positive-electrode active material layer on the negative electrode even after high-temperature storage, having a favorable capacity recovery rate, and having high-temperature storage stability allowing preservation of the discharge characteristics. It is obvious when Example 2 is compared with a case where no nitrogen-containing cyclic compound is contained (Comparative Example 2).

Also in the case where the polyamide separator is placed similarly to Example 1, comparison of Examples 2-1 to 2-13 with Examples 2-14 to 2-17, which are similar except that the nitrogen-containing cyclic compound has no unsaturated bond in the cyclic ring, shows that the nitrogen-containing cyclic compound is more preferably a nitrogen-containing cyclic compound having an unsaturated bond in the cyclic ring.

Comparison between Example 2-1 and Comparative Example 2 reveals that it is not possible to obtain favorable high-temperature storage stability even when the polyamide separator is formed, if the nonaqueous electrolyte solution does not contain pyrrole. Thus, it is obvious that it is not possible to obtain a nonaqueous electrolyte secondary battery superior in high-temperature storage stability even when the separator described in Japanese Patent No. 3175730 is used as placed on the electrode surface, and thus, the invention is insufficient from the point of improvement in high-temperature stability.

Example 3

Example 3 is carried out similarly to Example 1-1, except that the separator shown in Table 3 was used instead of forming a porous protective film on the surface of the negative-electrode active material layer. Example 3-7 is the same as Example 2-1. The samples of Example 3 were also evaluated. Results are summarized in Table 3.

The abbreviations used in Table 3 are the followings:

| PTFE: | polytetrafluoroethylene |
|---|---|
| PFA: | tetrafluoroethylene-perfluoroalkyl vinylether copolymer |
| FEP: | tetrafluoroethylene-hexafluoropropylene copolymer |
| ETFE: | tetrafluoroethylene-ethylene copolymer |
| PVDF: | polyvinylidene fluoride |
| PCTFE: | polychloro-trifluoroethylene |

| PA: | polyamide |
|---|---|
| PI: | polyimide |
| PAI: | polyamide-imide |
| PEI: | polyether imide |
| PAR: | polyarylate |
| PSF: | polysulfone |
| PES: | polyether sulfone |
| PPS: | polyphenylene sulfide |
| PEEK: | polyether ether ketone |
| PET: | polyethylene terephthalate |
| PBT: | polybutylene terephthalate |
| PPE: | polyphenylene ether |
| POM: | polyoxymethylene |
| PS: | polystyrene |
| ASA: | acrylonitrile-styrene-acrylate terpolymer |
| Alumina-containing PAN: | alumina-containing polyacrylonitrile (PAN) |
| Alumina-containing PVDF: | alumina-containing polyvinylidene fluoride (PVDF) |
| Alumina-containing PES: | alumina-containing polyether sulfone (PES) |

The polyimide (PI) separator used was a polyimide porous film (Upilex PT (product name), manufactured by Ube Industries. Ltd.).

The other separators were prepared in the following manner:

Each polymer was dissolved in a particular organic solvent, to give a polymer solution. The solution was extruded through a die of extruder into a sheet-shaped article. Then, the extruded sheet is cooled to 90° C. or lower at a cooling rate of 50° C./minute, to give a gel composition.

Then, the gel molding was stretched biaxially at a particular magnification, to give a molded article. The molded article obtained was then washed with cleaner, until the content of the residual solvent became less than 1% by mass. The cleaner used was altered properly according to the kind of the solvent used. Then, the molded article is dried for removal of the cleaner.

Finally, the dry molded article was heat-set at a temperature of 100° C. or higher, to give a separator.

The alumina-containing PAN, the alumina-containing PVDF, and the alumina-containing PES were prepared similarly, except that alumina having a median diameter of 0.3 µm was added and dispersed during preparation of the respective polymer solutions.

TABLE 3

| | SEPARATOR | PYRROLE | METAL ELUTION AMOUNT (μg/g) | CAPACITY RECOVERY RATE (%) |
|---|---|---|---|---|
| EXAMPLE3-1 | PTFE | YES | 8.0 | 84.8 |
| EXAMPLE3-2 | PFA | | 9.4 | 82.7 |
| EXAMPLE3-3 | FEP | | 9.5 | 82.5 |
| EXAMPLE3-4 | ETFE | | 9.5 | 82.6 |
| EXAMPLE3-5 | PVDF | | 9.0 | 83.1 |
| EXAMPLE3-6 | PCTFE | | 9.8 | 82.0 |
| EXAMPLE3-7 | PA | | 7.0 | 85.7 |
| EXAMPLE3-8 | PI | | 9.2 | 83.2 |
| EXAMPLE3-9 | PAI | | 9.4 | 83.0 |
| EXAMPLE3-10 | PEI | | 12 | 81.1 |
| EXAMPLE3-11 | PAR | | 12 | 80.9 |
| EXAMPLE3-12 | PSF | | 13 | 80.6 |
| EXAMPLE3-13 | PES | | 13 | 80.6 |
| EXAMPLE3-14 | PPS | | 14 | 80.2 |
| EXAMPLE3-15 | PEEK | | 13 | 80.5 |
| EXAMPLE3-16 | PET | | 15 | 80.1 |
| EXAMPLE3-17 | PBT | | 12 | 81.2 |
| EXAMPLE3-18 | PPE | | 13 | 80.0 |
| EXAMPLE3-19 | POM | | 14 | 80.3 |
| EXAMPLE3-20 | PS | | 15 | 80.2 |
| EXAMPLE3-21 | ASA | | 14 | 80.4 |
| EXAMPLE3-22 | ALUMINA-CONTAINING PAN | | 6.5 | 86.2 |
| EXAMPLE3-23 | ALUMINA-CONTAINING PVDF | | 6.7 | 86.0 |
| EXAMPLE3-24 | ALUMINA-CONTAINING PES | | 6.9 | 85.8 |

As obvious from Table 3, presence of a nitrogen-containing cyclic compound in the nonaqueous electrolyte solution and a separator comprising a material containing an element high in electronegativity or an electron-withdrawing substituent group placed between the positive and negative electrodes (Example 3) is effective in giving a battery resistant to deposition of the metal contained in the positive-electrode active material layer on the negative electrode even after high-temperature storage, having a favorable capacity recovery rate, and having high-temperature storage stability allowing preservation of the discharge characteristics. The results also show that, even when the kind of the element high in electronegativity or electron-withdrawing substituent group contained in the materials for the separator is altered, the amount of the metal deposited on the negative electrode after storage declines, and thus, that it is possible to obtain a battery superior in the capacity recovery rate after storage.

Further, comparison of Examples 3-7 and 3-22 to 24 with other Examples reveals that, when an inorganic oxide-containing separator (alumina-containing PAN, alumina-containing PVDF, alumina-containing PES) or a polyamide (PA) separator is used, it is possible to obtain a battery particularly resistant to deposition of the metal contained in the positive-electrode active material layer on the negative electrode even after high-temperature storage, particularly favorable in capacity recovery rate, and particularly high in high-temperature storage stability allowing preservation of the discharge characteristics.

Example 4

Example 4 is carried out similarly to Example 1-1, except that the position of adding the nitrogen-containing cyclic compound pyrrole and the position of forming the porous protective film were changed as shown in Table 4. Example 4-4 is the same as Example 1-1. The samples of Example 4 were also evaluated similarly. Results are summarized in Table 4.

As for the position of adding pyrrole in the case of the positive-electrode active material layer, pyrrole in an amount similar to that added to the nonaqueous electrolyte solution was added to the positive electrode mixture, before preparation of the positive electrode. Alternatively, as for the position of adding pyrrole in the case of the negative-electrode active material layer, pyrrole in an amount similar to that added to the nonaqueous electrolyte solution was added to the negative electrode mixture, similarly to the positive-electrode active material layer, before preparation of the negative electrode.

TABLE 4

| | PYRROLE ADDITION POSITION | POROUS PROTECTIVE FILM-FORMING POSITION | SEPARATOR | METAL ELUTION AMOUNT (μg/g) | CAPACITY RECOVERY RATE (%) |
|---|---|---|---|---|---|
| EXAMPLE4-1 | NONAQUEOUS ELECTROLYTE SOLUTION | POSITIVE ELECTRODE SURFACE | YES | 6.4 | 86.5 |
| EXAMPLE4-2 | POSITIVE-ELECTRODE ACTIVE MATERIAL LAYER | | | 6.1 | 86.9 |
| EXAMPLE4-3 | NEGATIVE-ELECTRODE ACTIVE MATERIAL LAYER | | | 8.2 | 84.0 |
| EXAMPLE4-4 | NONAQUEOUS ELECTROLYTE SOLUTION | NEGATIVE ELECTRODE SURFACE | | 6.2 | 86.8 |
| EXAMPLE4-5 | POSITIVE-ELECTRODE ACTIVE MATERIAL LAYER | | | 8.0 | 83.7 |

TABLE 4-continued

| | PYRROLE ADDITION POSITION | POROUS PROTECTIVE FILM-FORMING POSITION | SEPARATOR | METAL ELUTION AMOUNT (μg/g) | CAPACITY RECOVERY RATE (%) |
|---|---|---|---|---|---|
| EXAMPLE4-6 | NEGATIVE-ELECTRODE ACTIVE MATERIAL LAYER | | | 5.8 | 87.5 |
| EXAMPLE4-7 | NONAQUEOUS ELECTROLYTE SOLUTION | POSITIVE ELECTRODE SURFACE | NO | 6.3 | 86.8 |
| EXAMPLE4-8 | POSITIVE-ELECTRODE ACTIVE MATERIAL LAYER | | | 6.0 | 87.1 |
| EXAMPLE4-9 | NEGATIVE-ELECTRODE ACTIVE MATERIAL LAYER | | | 8.0 | 84.3 |
| EXAMPLE4-10 | NONAQUEOUS ELECTROLYTE SOLUTION | NEGATIVE ELECTRODE SURFACE | | 6.0 | 87.0 |
| EXAMPLE4-11 | POSITIVE-ELECTRODE ACTIVE MATERIAL LAYER | | | 7.7 | 84.6 |
| EXAMPLE4-12 | NEGATIVE-ELECTRODE ACTIVE MATERIAL LAYER | | | 5.6 | 87.8 |

As obvious from Table 4, a battery containing pyrrole in the nonaqueous electrolyte solution, the positive-electrode active material layer or the negative-electrode active material layer and also a porous protective film formed on the surface of the positive or negative electrode (Example 4) is resistant to deposition of the metal contained in the positive-electrode active material layer on the negative electrode even after high-temperature storage and has a favorable capacity recovery rate. Thus, pyrrole may be added to the nonaqueous electrolyte solution or the electrode. In addition, the porous protective film may be formed on the surface of the positive or negative electrode.

When the position of adding pyrrole and the porous protective film are present on the side of the same electrode (Examples 4-2, 4-6, 4-8, and 4-12), the resulting batteries are more favorable, and thus, they would be preferably on the side of the same electrode.

Example 5

Example 5 is carried out similarly to Example 1, except that the nonaqueous solvent was changed to each nonaqueous solvent shown in Table 5. Example 5-1 is the same as Example 1-1.

Comparative Example 5

Comparative Example 5 is carried out similarly to Example 5, except that the nonaqueous electrolyte solution contained no nitrogen-containing cyclic compound.

Samples of Example 5 and Comparative Example 5 were also evaluated similarly. Results are summarized in Table 5.

TABLE 5

| | ELECTROLYTE SOLUTION SOLVENT | PYRROLE (PARTS BY MASS) | POROUS PROTECTIVE FILM | METAL ELUTION AMOUNT (μg/g) | CAPACITY RECOVERY RATE (%) |
|---|---|---|---|---|---|
| EXAMPLE5-1 | EC:EMC = 1:4 | 2 | YES | 6.2 | 86.8 |
| EXAMPLE5-2 | EC:DMC = 1:4 | | | 6.1 | 86.8 |
| EXAMPLE5-3 | EC:DEC = 1:4 | | | 6.4 | 86.2 |
| EXAMPLE5-4 | EC:EMC:DMC = 1:1:3 | | | 6.1 | 86.8 |
| EXAMPLE5-5 | EC:PC:DMC = 1:1:3 | | | 5.9 | 87.4 |
| EXAMPLE5-6 | EC:EMC:DEC = 3:5:2 | | | 6.7 | 85.5 |
| EXAMPLE5-7 | EC:EMC = 2:3 | | | 6.6 | 86.1 |
| EXAMPLE5-8 | EC:PC = 2:3 | | | 5.2 | 88.0 |
| EXAMPLE5-9 | EC:GBL = 2:3 | | | 8.4 | 84.1 |
| EXAMPLE5-10 | EC:GVL = 2:3 | | | 8.6 | 83.9 |
| EXAMPLE5-11 | EC:SL = 2:3 | | | 5.8 | 87.5 |
| EXAMPLE5-12 | EC:3MeSL = 2:3 | | | 6.0 | 86.5 |
| COMPARATIVE EXAMPLE5-1 | EC:EMC = 1:4 | 0 | | 25 | 63.0 |
| COMPARATIVE EXAMPLE5-2 | EC:DMC = 1:4 | | | 23 | 63.4 |
| COMPARATIVE EXAMPLE5-3 | EC:DEC = 1:4 | | | 28 | 61.1 |
| COMPARATIVE EXAMPLE5-4 | EC:EMC:DMC = 1:1:3 | | | 24 | 63.2 |
| COMPARATIVE EXAMPLE5-5 | EC:PC:DMC = 1:1:3 | | | 21 | 64.7 |
| COMPARATIVE EXAMPLE5-6 | EC:EMC:DEC = 3:5:2 | | | 30 | 58.8 |
| COMPARATIVE EXAMPLE5-7 | EC:EMC = 2:3 | | | 26 | 62.9 |
| COMPARATIVE EXAMPLE5-8 | EC:PC = 2:3 | | | 20 | 64.2 |
| COMPARATIVE EXAMPLE5-9 | EC:GBL = 2:3 | | | 29 | 59.0 |
| COMPARATIVE EXAMPLE5-10 | EC:GVL = 2:3 | | | 31 | 57.5 |
| COMPARATIVE EXAMPLE5-11 | EC:SL = 2:3 | | | 27 | 61.8 |
| COMPARATIVE EXAMPLE5-12 | EC:3MeSL = 2:3 | | | 30 | 59.1 |

As obvious from Table 5, if a nitrogen-containing cyclic compound is contained, it is possible to obtain a nonaqueous electrolyte secondary battery superior in high-temperature storage stability, even when the various nonaqueous solvent are used as the nonaqueous solvent (Example 5). It is obvious when Example 5 is compared with the case where no nitrogen-containing cyclic compound is contained (Comparative Example 5).

Example 6

Example 6 was carried out similarly to Example 1, except that the amount of pyrrole added changed to the amount shown in Table 6. Example 6-5 is the same as Example 1-1. The samples of Example 6 were also evaluated similarly. Results are summarized in Table 6.

TABLE 6

|  | PYRROLE (PARTS BY MASS) | POROUS PROTECTIVE FILM | METAL ELUTION AMOUNT (µg/g) | CAPACITY RECOVERY RATE (%) |
| --- | --- | --- | --- | --- |
| EXAMPLE6-1 | 0.05 | YES | 18 | 75.6 |
| EXAMPLE6-2 | 0.1 |  | 14 | 80.3 |
| EXAMPLE6-3 | 0.5 |  | 10 | 82.2 |
| EXAMPLE6-4 | 1 |  | 9.2 | 83.1 |
| EXAMPLE6-5 | 2 |  | 6.2 | 86.8 |
| EXAMPLE6-6 | 3 |  | 5.6 | 85.1 |
| EXAMPLE6-7 | 5 |  | 5.3 | 82.9 |
| EXAMPLE6-8 | 10 |  | 5.0 | 80.6 |
| EXAMPLE6-9 | 20 |  | 4.7 | 71.1 |

Table 6 shows that the addition amount of pyrrole is preferably 0.1 to 10 parts by mass.

Thus, it is possible to obtain a nonaqueous electrolyte secondary battery superior in high-temperature storage stability, if a film is formed on the surface of at least one of positive and negative electrodes and a nitrogen-containing cyclic compound is contained in at least one of the positive electrode, the negative electrode and the nonaqueous electrolyte solution.

As described above in detail, an aspect of the present invention is the nonaqueous electrolyte secondary battery, comprises a positive electrode having a positive-electrode active material layer reversibly inserting and extracting lithium ions on a positive-electrode current collector, a negative electrode having a negative-electrode active material layer reversibly inserting and extracting lithium ions on a negative-electrode current collector, and a nonaqueous electrolyte solution, wherein at least one of the positive and negative electrodes has a film on the surface and at least one of the positive electrode, the negative electrode and the nonaqueous electrolyte solution contains a nitrogen-containing cyclic compound.

In the configuration, by an action of the film formed on the electrode surface in cooperation with a polymeric film derived from the nitrogen-containing cyclic compound, the films formed on the positive electrode surface inhibit elution of the metal cations from the positive-electrode active material layer, while the films formed on the negative electrode surface inhibit deposition of the metal cations as metal on the negative electrode surface. In this way, the nonaqueous electrolyte secondary battery according to the present invention becomes superior in high-temperature storage stability allowing preservation of favorable discharge rate even after high-temperature storage.

The film is preferably an inorganic oxide-containing film or a polyamide film. Such a film inhibits elution of metal cations from the positive-electrode active material layer and deposition of the metal on the negative electrode surface more effectively, without disturbing the electrode reaction between the lithium ions in the nonaqueous electrolyte solution and the positive and negative electrodes.

When the film is an inorganic oxide-containing film, the inorganic oxide is preferably at least one compound selected from the group consisting of alumina, titania, zirconia, magnesia and silica. Alternatively when the film is a polyamide film, the polyamide in the polyamide film is preferably an aramide. The film formed on the electrode inhibits elution of metal cations from the positive-electrode active material layer and deposition of the metal on the negative electrode surface more effectively. In addition, the inorganic oxide and the polyamide in the polyamide film are favorable, because it is more chemically stable in the environment using battery.

Another aspect of the present invention is a nonaqueous electrolyte secondary battery, comprising a positive electrode having a positive-electrode active material layer reversibly inserting and extracting lithium ions on a positive-electrode current collector, a negative electrode having a negative-electrode active material layer reversibly inserting and extracting lithium ions on a negative-electrode current collector, a separator placed between the positive and negative electrodes, and a nonaqueous electrolyte solution, wherein the separator comprises a material containing an element high in electronegativity or an electron-withdrawing substituent group, and at least one of the positive electrode, the negative electrode and the nonaqueous electrolyte solution contains a nitrogen-containing cyclic compound.

In the configuration above, by a cooperactive action of the separator made of a material containing an element high in electronegativity or an electron-withdrawing substituent group and the polymeric film derived from nitrogen-containing cyclic compound, the side of the separator in contact with the positive electrode surface allows to inhibit elution of metal cations from the positive-electrode active material layer, while the side of the separator in contact with the negative electrode surface allows to inhibit deposition of the metal cations as metal on the negative electrode surface. In this way, the nonaqueous electrolyte secondary battery according to the present invention is superior in high-temperature storage stability allowing preservation of favorable discharge rate even after high-temperature storage.

The separator is preferably an inorganic oxide-containing separator or a polyamide separator. Such a separator inhibits elution of metal cations from the positive-electrode active material layer and deposition of the metal on the negative electrode surface more effectively. In addition, the inorganic oxide and the polyamide in the polyamide separator are favorable, because it is more chemically stable in the environment using the battery.

When the separator is an inorganic oxide-containing separator, the inorganic oxide is preferably at least one compound selected from the group consisting of alumina, titania, zirconia, magnesia and silica. Alternatively when the separator is a polyamide separator, the polyamide in the polyamide separator is preferably an aramide. The separator placed between the positive and negative electrodes inhibits elution of metal cations from the positive-electrode active material layer and deposition of the metal on the negative electrode surface more effectively. In addition, the inorganic oxide and the polyamide in the polyamide separator are favorable, because it is more chemically stable in the environment using battery.

The nitrogen-containing cyclic compound is preferably a nitrogen-containing cyclic compound having an unsaturated bond in the cyclic ring, and more preferably pyrrole. Such a nitrogen-containing cyclic compound is high in polymerization reactivity and thus, forms a polymeric film high in polymerization degree on the electrode surface. Such a polymeric film is resistant to peeling from the electrode, and thus, the electrode having the polymeric film thus formed inhibits elution of metal cations from the positive-electrode active material layer and deposition of the metal on the negative electrode surface for an extended period of time. It is thus possible to obtain a nonaqueous electrolyte secondary battery more superior in high-temperature storage stability.

The nonaqueous electrolyte solution preferably contains the nitrogen-containing cyclic compound in an amount of 0.1 to 10 parts by mass, with respect to 100 parts by mass of the nonaqueous solvent. In the configuration, it is possible to accelerate insertion and extraction of lithium ions without disturbing the electrode reaction.

The nonaqueous electrolyte solution preferably contains at least one nonaqueous solvent selected from ethylene carbonate, propylene carbonate, and sulfolane. In the configuration, it is possible to obtain a nonaqueous electrolyte secondary battery superior in high-temperature storage stability.

This application is based on Japanese Patent application serial no. 2007-039326 filed in Japan Patent Office on Feb. 20, 2007, the contents of which are hereby incorporated by reference.

Although the present invention has been fully described by way of example, it is to be understood that various changes and modifications will be apparent to those skilled in the art. Therefore, unless otherwise such changes and modifications depart from the scope of the present invention hereinafter defined, they should be construed as being included therein.

What is claimed is:

1. A nonaqueous electrolyte secondary battery, comprising:
  a positive electrode having a positive-electrode active material layer reversibly inserting and extracting lithium ions on a positive-electrode current collector;
  a negative electrode having a negative-electrode active material layer reversibly inserting and extracting lithium ions on a negative-electrode current collector; and
  a nonaqueous electrolyte solution, wherein:
  at least one of the positive and negative electrodes has a film on the surface,
  at least one of the positive electrode and the negative electrode contains a nitrogen-containing cyclic compound,
  the nitrogen-containing cyclic compound is pyrrole,
  the electrode containing the nitrogen-containing cyclic compound is the same as the electrode having the film on the surface thereof,
  the nitrogen-containing cyclic compound is bonded to the surface of the positive-electrode active material layer or the negative-electrode active material layer, and
  the content amount of the nitrogen-containing cyclic compound is from 1 to 5 parts by mass with respect to 100 parts by mass of the nonaqueous solvent.

2. The nonaqueous electrolyte secondary battery according to claim 1, wherein the film is an inorganic oxide-containing film.

3. The nonaqueous electrolyte secondary battery according to claim 2, wherein the inorganic oxide is at least one compound selected from the group consisting of alumina, titania, zirconia, magnesia and silica.

4. The nonaqueous electrolyte secondary battery according to claim 2, wherein the polyamide in the polyamide film is an aramide.

5. The nonaqueous electrolyte secondary battery according to claim 1, wherein the nonaqueous electrolyte solution contains at least one nonaqueous solvent selected from ethylene carbonate, propylene carbonate, and sulfolane.

* * * * *